Figure 3:
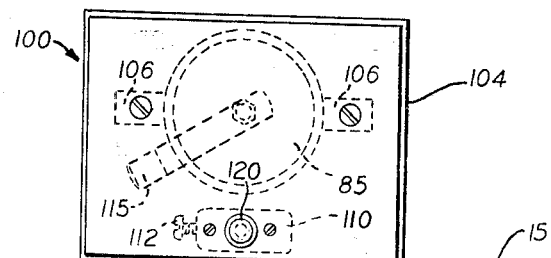

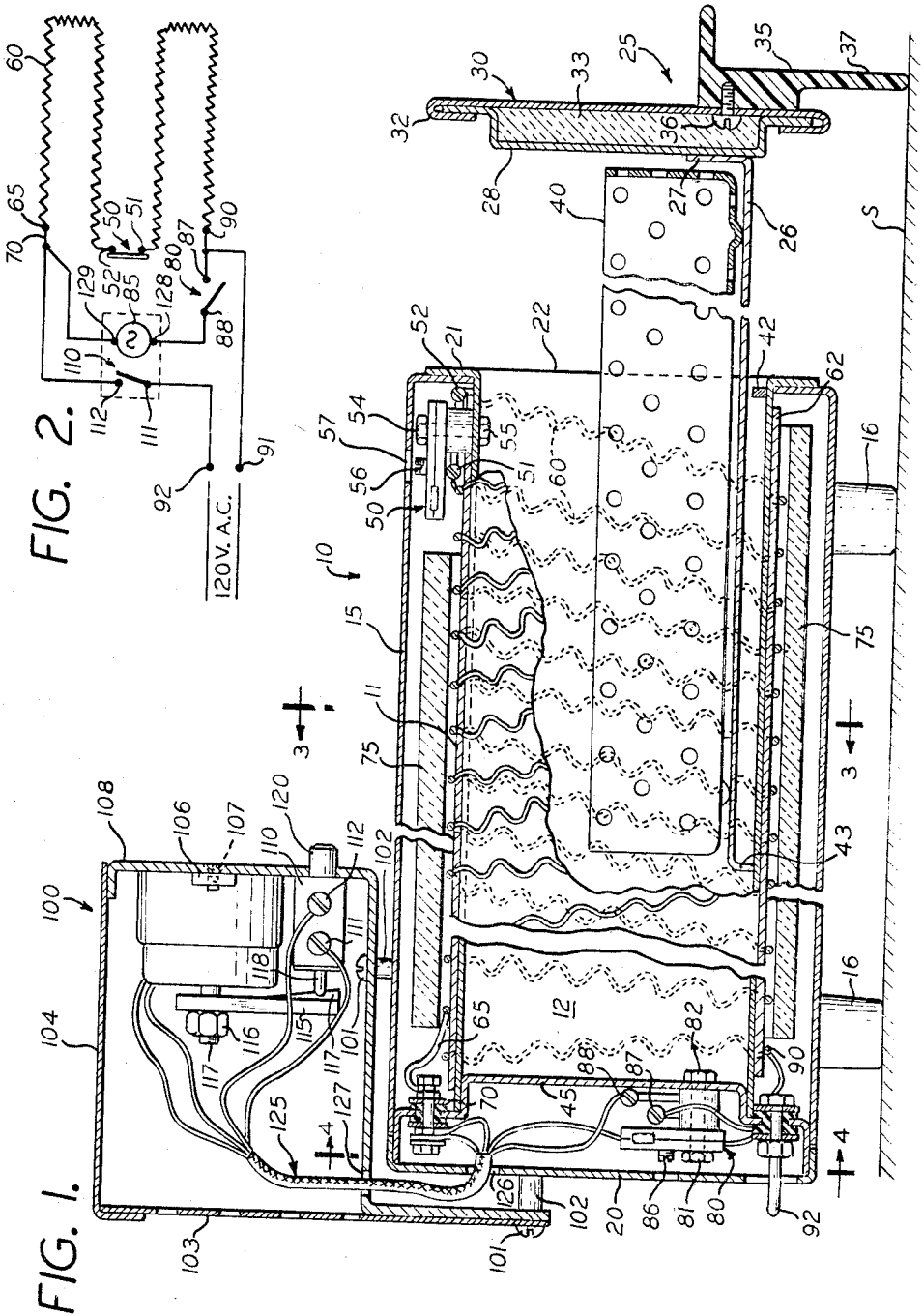

Oct. 11, 1966          H. G. SKALLER          3,278,256

HOT AIR STERILIZATION CHAMBER

Filed Oct. 10, 1962          2 Sheets-Sheet 2

INVENTOR.
H. GEORGE SKALLER

BY Robert W. Siddle

ATTORNEY.

United States Patent Office 3,278,256
Patented Oct. 11, 1966

3,278,256
HOT AIR STERILIZATION CHAMBER
Hans George Skaller, 32—03 171st St., Flushing, N.Y.
Filed Oct. 10, 1962, Ser. No. 229,700
6 Claims. (Cl. 21—93)

My invention relates to improved means in the art of sterilization utilizing hot air as the sterilizing agent. The suitability of hot air as an effective sterilizing agent, under conditions at controlled temperature and time relationships, is well known to those skilled in the art. Among the many useful characteristics of hot air as a sterilizing agent is the absence of moisture which is conducive for maintaining sharp edges of cutting instruments, and aids in the penetration of the required high air temperature into instruments with extremely fine cannular openings that cannot be penetrated by steam.

However, sterilizing techniques employing hot air as the sterilizing agent are not widely practiced due to the relatively long time of exposure required to effect desired sterilization and because of the difficulties in producing and maintaining uniform air temperatures within a confined area due to the tendency of air layers at different temperatures to stratify thereby rendering such techniques undependable, and therefore unsafe. Attempts have been made to employ mechanical convection devices such as circulating fans in hot air sterilizers to overcome stratification and produce more uniform temperatures, but such devices are bulky and only partially ameliorate the dangers of stratification.

Because of the difficulty of maintaining uniform air temperatures within a confined area, the accepted timing exposure for safe sterilization at 182° C. is 1 hour, notwithstanding the fact that bacteriological investigation has proven that no living organism including the most resistant spore formers known can survive exposure to hot air at 182° C. for more than a few minutes. The resuirement for 1 hour exposure at 182° C. as presently practiced is the result of design inadequacy in failing to attain the required temperature at all points of the confined area. Furthermore, the temperature in all hot air sterilizers is registered by a thermometer with the sensing bulb installed at the hottest point of the system. The 1 hour exposure requirement therefore is an additional safeguard to insure stabilization and attainment of desired temperatures in the cooler section of the confined area. This relatively long exposure has a deleterious effect on many goods to be sterilized eliminating the desirable qualities possibly attainable by the use of hot air.

Timing devices used for hot air sterilization are spring wound devices operating independently of the internal temperature within the sterilizing chamber. They are manually set and the amount of timing is left to the discretion of the operator. At the end of such a timing cycle a switch is actuated de-energizing the supply of heat to the heating elements. Such devices are very objectionable and contribute to faulty sterilization because the amount of timing is left to the discretion of the operator and because the timing proceeds without any check relative to the internal temperature conditions. Further, in the event of power failure, the temperature may drop safe sterilization limits whereas the timer will continue to time giving the operator the false impression that at the end of the timing period sterilization has been achieved.

It is with the above problems and desiderata in mind that this invention has been evolved utilizing a novel concept in hot air sterilization, retaining the acknowledged superiorities of hot air as a sterilizing agent, but eliminating the aforementioned drawbacks particularly those of excessive exposure requirements and undependable temperature conditions due to stratification and improper timing which may render such sterilizing process unsafe.

It is accordingly among the primary objects of this invention to provide efficient sterilizing means utilizing hot air.

Another important object of the invention is to provide improved hot air sterilizing means not requiring involved air handling equipment or techniques.

A further object of the invention is to provide means permitting effective hot air sterilization in relatively short time periods.

These and other objects of the invention which will become hereafter apparent are achieved by providing a novel sterilizing device having a sterilizing chamber of substantially rectangular shape with generally rounded corners and of low height just sufficient to provide clearance for the articles to be sterilized, so that the natural stratification tendency forming different temperature zones due to height differentials is reduced to a minimum. Furthermore the source of heat is applied from the outside of the confined area in such manner that the B.t.u. density provided in the chamber is uniform and equal. Because of the uiform application of heat by the heat source, and uniform output of heat from all surfaces confining the volumetric area to be used as a sterilizing chamber, the temperature conditions within the confined volume are, for practical purposes of sterilization, uniform and void of objectionable stratification.

In my invention the sterilizing chamber has a back member and a front or door member through which the articles to be sterilized are loaded into the chamber. The door is insulated to reduce heat losses but the back of the chamber is formed by a metal chamber back panel which is not heated from the outside. It can therefore be seen that the coolest point of the entire system must be the lowest point of the chamber back panel on the vertical center axis of the panel. At this coolest point I install a bi-metallic temperature responsive sensing device which is calibrated to energize a fixed interval timing mechanism when the safe minimum temperature for sterilization has been attained.

An electrically operated fixed interval timing mechanism energized only when the safe minimum temperature has been reached in the sterilizing chamber is employed. The timing mechanism automatically recycles if during the pre-set period of timing the temperature drops below the safe sterilization temperature.

The entire processing of all cycles in my system of hot air sterilization is fully automatic only requiring the operator to push a start button to begin the processing. Several monitoring lights indicate the various operations being performed such as the supplying of heat to the heating elements, the attainment of the desired minimum temperature, and the completion of the entire process.

The maximum allowable sterilization temperature is controlled by another bi-metallic sensing device which cuts off the heat supply when the temperature rises above the set maximum temperature and cuts in the heat supply when the temperature within the chamber drops below the safe minimum temperature.

Figure 4:
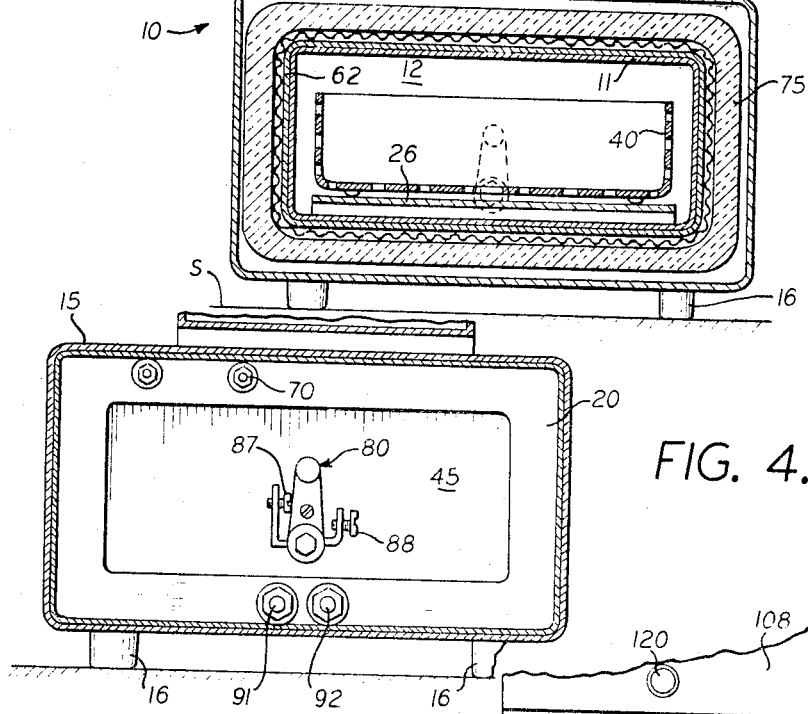
Figure 5:
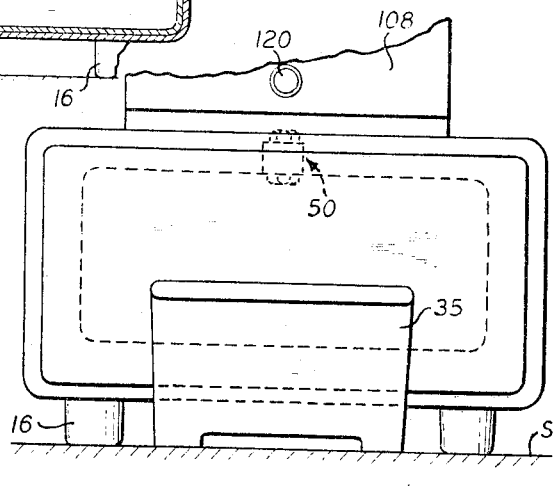

The specific details of a preferred embodiment of the invention and their mode of functioning will be particularly pointed out in clear concise and exact terms in conjunction with the accompanying drawings, wherein:

FIG. 1 is a side elevation with parts broken away of an embodiment of my invention shown in open position, parts being broken away for clarity; and FIG. 2 is a wriing diagram schematically showing the electrical circuit employed; and FIG. 3 is a cross sectional view on line 3—3 of FIG. 1; and FIG. 4 is a cross sectional view of the inner chamber taken on line 4—4 of FIG. 1; and FIG. 5 is a front elevational view of the novel sterilizing device in closed operative position, with the control cabinet partly cut away.

Referring now more particularly to the drawings, the novel device 10, as best seen in FIGS. 1 and 3 is formed with inner casing 11 which defines the bounds of sterilizing chamber 12, said casing 11 being disposed within a housing 15 mounted on legs 16. Housing 15 is closed off at the back with rear housing plate 20. Chamber 12 as illustrated in FIGS. 1 and 3 is of a box like configuration having a length greater than its height or width. The length is preferably greater than twice its width, and the height is smaller than its width. As a result of the illustrated configuration stratification is minimized.

In the illustrated form of my invention in FIG. 1 the inner casing 11 has a front peripheral flange 21 defining the front opening 22. Slidingly disposed within the casing 11 is the tray support drawer assembly 25. Drawer assembly 25 includes a tray support 26 having a vertical flange 27 bent upwardly and fastened in conventional manner to the back plate 28 of front door assembly 30. The front door plate 30 is joined with the door back plate 28 by means of overlapping flange 32. A layer of insulating material 33 is sandwiched between the two door plates. A plastic non-heat conducting molded handle member 35 is fastened by means of screws 36 to the front plate 30 of the door. Said handle member 35 has a downward extending foot 37 making contact with the surface S on which the entire device is placed to provide support for the drawer assembly 25 when the door 30 is pulled out.

Perforated loading tray 40 rests on tray support 26 which is an integral part of drawer assembly 25. When the drawer assembly 25 is operatively closed, the flange 32 of the door 30 abuts against the peripheral flange 21 of the inner casing 11. A stop member 42 fastened to the inside of the inner casing 11 engages tray flange 43 (to the left on tray 26, as viewed in FIG. 1) and limits the horizontal withdrawal of the drawer assembly 25 from the inner casing 11 or loading chamber 12. At the back of the inner casing 11 chamber back panel 45 is nested peripherally into the inner casing 11 and secured in conventional manner by welding, soldering, or the like.

On the top of the inner casing 11 near the front (to the right as viewed in FIG. 1) and located on the vertical center axis of the entire device, there is fastened a conventional bi-metallic thermostatic electric switch 50 having terminal screws 51 and 52. This switch 50 is fastened to the top of the inner casing by means of bolt 54 and nut 55 with the thermal sensing element being in close contact with the outer surface of casing 11. A slotted adjusting screw 56 accessible through an aperture 57 located concentrically in the housing 15 permits calibration of the bi-metallic thermostatic switch in known manner. Normally the bi-metallic switch 50 is closed, and opens on a temperature rise inside the loading chamber 12. Terminal screws 51 and 52 electrically connected to and interposed between the circuit of the nichrome wire heating element 60 is wound over the electrical insulating layer 62 wrapped around the outside of the inner casing 11.

A lead 65 (at the upper left in FIG. 1) from the nichrome heating element 60 is connected to a binding post 70. An insulating pad 75 is wrapped around the heating coil protecting the housing 15 against excessive heat, and retaining the heat in chamber 12.

A bi-metallic thermostatic electric switch 80 of conventional design similar to switch 50 is fastened by means of screw 81 and nut 82 to the chamber back panel 45, switch 80 being positioned on the vertical center axis of said back panel at the lowest point within the inner casing 11. This bi-metallic switch 80 of well known design is normally open, and closes an electric circuit at a predetermined temperature when energization of the timing motor 85 is desired. A slotted calibration screw 86 accessible through a concentrically located aperture in the rear plate 20 of the outer housing allows for calibration of the bi-metallic device in known manner. Switch terminal screws 87 and 88 are electrically connected to terminal 90 of the heating coil and to terminal 128 of the timing motor respectively. The other terminal 129 of timing motor 85 is connected to binding post 70, as best seen in FIG. 2.

Contact pins 91 and 92 are mounted in conventional manner to extend from the lower rear of housing 15 as best seen in FIGS. 1 and 4. These contact pins 91 and 92 are suitably spaced to permit a conventional appliance connector to supply electric power to the device, being connected to the contact pins through a suitable shaped aperture provided in the rear panel of the outer housing. On top of the outer housing 15 there is mounted a control housing 100 fastened in conventional manner by means of screws 101 to the outer housing. Tubular spacing members 102 are employed to provide ample air space between the control housing and the outer surfaces of the outer housing. The control housing is formed of sheet material such as steel or the like, with a perforated rear plate 103 and a cover housing 104. The three members forming the control housing are joined in conventional manner. A conventional synchronous electric timing motor assembly 85 with a fixed timing interval and a conventionally well known recycling mechanism returning the timing mechanism always to the starting position at the lapse of the fixed interval is mounted on bracket ears 106 and screws 107 on the vertical front panel 108 of the control housing 100.

A conventional miniature single pole, single throw electric switch 110 with terminal screws 111 and 112 is similarly fastened to the vertical control panel 108 in operative relationship with the actuating arm 115 of motor 85. Arm 115 is fastened by means of locking nut 116 on the driving shaft 117 of the timer motor 85. The miniature switch 110 has an actuating pin 118 in operative spaced position relative to the sweep of the actuating timer arm 115 so that the pin 118 is moved to open the circuit controlled by said switch, when the inclined section 119 of the lower end of the actuating arm 115 slides past the pin 118. The actuating pin 118 is in co-axial connection with the reset button 120 of switch 110. Button 120 protrudes through the front panel 108 and upon operative resetting closes the switch after the recycling mechanism has returned the actuating arm 115 to its starting position. Terminal screws 111 and 112 of the switch 110 are electrically connected to the binding post 70 which in turn is in electrical connection with one end of heating coil 60 at lead 65.

A wire harness 125 consisting of four conductors and guided through suitable apertures 126 and 127 provided in the rear plate 20 of the outer housing 15 and the bottom section of the control housing 100, is provided to facilitate the making of necessary electrical connections between all terminals, as shown in the FIG. 2 schematic wiring diagram.

The operative sequence of the device can now be easily followed. Goods to be sterilized are loaded into the perforated tray 40. The tray becomes accessible for loading by withdrawing the tray supporting drawer assembly 25. When the drawer assembly 25 is closed the reset button 120 is pressed closing switch 10. The first bi-metallic electric switch 50 being normally closed, and the second bi-metallic switch 80 normally open, electric current is now fed through the heating coil 60. The timer motor 85 wired in parallel with the heating element is not energized as long as the second bi-metallic switch 80 remains in its normally open position. As the temperature rises within the inner casing 11, the normally closed bi-metallic switch 50 opens and interrupts the current supply to the heating coil 60. As the temperature drops the first bi-metallic switch 50 closes again re-energizing the heating coil. Thus, a cycling performance of the thermostatic switch is established responsive to the temperature level to be controlled within the inner casing 11. The second normally open bi-metallic thermostatic switch 80 by virtue of its location in the coolest place in the system and calibrated to operate at the same temperature as the first thermostatic switch 50 will become energized later than the first one. Since the second normally open thermostatic switch 80 closes on a heat rise it closes the circuit to the timing motor 85. Inasmuch as the first switch 50 maintains the selected temperature in the inner casing and inasmuch as the second switch 80 located in the coolest point with respect to sterilizing chamber 12 is only energized after the temperature controlled by the first switch 50 is attained at the coolest point of the system, it follows that the second switch will not cycle and will remain closed as long as the first thermostatic switch 50 maintains the selected temperature in the inner chamber 12.

When the actuating arm 115 of the fixed interval timer motor 85 passes the actuating pin 118 of the switch 110, the inclined portion 119 of the lower end of the actuating arm 115 actuates the pin 118 of the switch 110, opening the circuit to the entire device and returning the actuating arm 115 to its original position.

The re-set push button 120 being in operative connection with the actuating pin 118 is also returned to its original starting position. As the temperature drops in the device, the first bi-metallic thermostatic switch 50 closes and the second bi-metallic thermostatic switch 80 opens the circuit returning the entire unit to its starting position for another operative cycle.

It is thus seen that simple hot air sterilizing means have been evolved in which by virtue of the thermostatic switches 80 and 50 desired temperatures within the sterilizing chamber 12 may be obtained with necessary certainty to insure sterilization. Since the temperatures are in a sense insured, the time required may be regulated and the desired attributes of hot air as a sterilizing agent fully enjoyed.

The above disclosure has been given by way of illustration and elucidation and it is desired to protect all embodiments of the herein disclosed inventive concept within the scope of the appended claims.

What is claimed is:

1. Hot air sterilizing means comprising: chamber means within which the items to be sterilized may be enclosed; heating means surrounding said chamber means; first temperature sensitive means in heat exchange relationship with said chamber means coupled to said heating means to permit energization of same in response to temperatures sensed by said first temperature sensitive means; second temperature sensitive means in heat exchange relationship with a coolest part of said chamber means, timer means coupled to said second temperature sensitive means and energized under the control thereof; and switch means controlling the energization of said heating means in response to the action of said timer means.

2. Hot air sterilizing means as in claim 1 in which said chamber means is at least twice as long as it is high whereby stratification will be minimized.

3. Hot air sterilizing means as in claim 1 in which said heating means are wrapped around said enclosure means; and said first temperature sensitive means is in heat exchange relationship with a topmost part of said chamber means, whereby the hottest temperatures are sensed.

4. A sterilizer comprising: an insulated enclosure casing defining a sterilizing chamber having top, bottom, and said walls; an electrical heating element in heat exchange relationship with the top, bottom and side walls of the chamber; a first thermostatic switch in the exchange relationship with the top wall of said chamber and in a circuit with said heating element to control the energization thereof in response to temperatures sensed by said first thermostatic switch; a second thermostatic switch in heat exchange relationship with a coolest part of the chamber; a timer electrically coupled to said second switch which controls energization of said timer when desired sterilizing temperatures obtain; and a switch in a circuit with said heater to discontinue energization thereof when said timer has been operated over a desired time interval.

5. A sterilizer as in claim 4 in which said chamber, is of a rectangular box-like configuration having a length greater than its height; and a non-insulated chamber back panel upon which said second switch is mounted.

6. In a sterilizing device, a chamber the height of which is smaller than its width and its length longer than either its height or width, confined on one end with a fixed rear panel and on the opposite end having an opening member providing access to the inside of the chamber for placing therein articles to be subjected to sterilization with hot air as the sterilizing agent, means for applying heat, electrically generated, externally and peripherally of the chamber for elevating the air confined therein to the desired sterilizing temperature, a first thermostatic electric switch in heat exchange relationship with said chamber for the purpose of energizing and de-energizing said heat applying means responsive to attainment of the temperature level selected and to be maintained in the sterilizing chamber, and a second similar thermostatic electric switch device mounted in heat exchange relationship with the coolest location of said chamber at a spaced distance from said first thermostatic switch, said second thermostatic switch energizing a motor driven timing device when the desired temperature level as controlled by the first thermostatic switch has been reached, and an electric switch operatively in conjunction with the timing device, said switch manually energized to close the circuit to the heating source and automatically de-energizing and opening the circuit to the heating source after the passage of a set period of time.

References Cited by the Examiner

UNITED STATES PATENTS

| 817,767 | 4/1906 | Hammond | 219—35 |
| 1,213,163 | 1/1917 | Dedrick | 219—35.12 |
| 2,623,449 | 12/1952 | Losee | 219—20.5 |

DONALL H. SYLVESTER, *Primary Examiner.*

MORRIS O. WOLK, *Examiner.*

S. L. BASHORE, *Assistant Examiner.*